United States Patent
Suey

Patent Number: 5,728,326
Date of Patent: Mar. 17, 1998

[54] METHOD OF MAKING HARD-FACED CERAMIC FIBER MODULE

[76] Inventor: Paul V. Suey, 255 Green Parrot La., Natrona Heights, Pa. 15065

[21] Appl. No.: 819,971

[22] Filed: Mar. 18, 1997

[51] Int. Cl.⁶ .................................................. C04B 41/87
[52] U.S. Cl. ........................... 264/28; 264/113; 264/640
[58] Field of Search ............................. 264/28, 640, 113

[56] References Cited

U.S. PATENT DOCUMENTS

| | | | |
|---|---|---|---|
| 2,869,215 | 1/1959 | Smith | 25/156 |
| 3,177,161 | 4/1965 | Smith-Johannsen | 252/502 |
| 3,512,571 | 5/1970 | Phelps | 164/37 |
| 3,816,572 | 6/1974 | Roelofs | 264/28 |
| 3,885,005 | 5/1975 | Downing et al. | 264/28 |
| 4,174,331 | 11/1979 | Myles | 260/29 |
| 4,246,209 | 1/1981 | Smith-Johannsen | 264/28 |
| 4,248,752 | 2/1981 | Myles | 260/29 |
| 4,341,725 | 7/1982 | Weaver et al. | 264/28 |
| 4,401,613 | 8/1983 | Abell | 264/86 |
| 5,047,181 | 9/1991 | Occhionero et al. | 264/28 |
| 5,120,477 | 6/1992 | Suey | 264/28 |
| 5,260,011 | 11/1993 | Wolter et al. | 264/640 |

FOREIGN PATENT DOCUMENTS 284 671  11/1990  Germany.

*Primary Examiner*—James Derrington
*Attorney, Agent, or Firm*—Armstrong, Westerman, Hattori, McLeland & Naughton

[57] ABSTRACT

A hard-faced ceramic fiber module is formed by providing a ceramic fiber sheet that is folded upon itself to form a first surface having adjacent folds and intermediate valleys by impregnating the first surface with an aqueous colloidal silica suspension, covering said impregnated first surface with a layer of a mixture of ceramic fibers in an aqueous colloidal suspension, compressing said layer, freezing said module and then heating the same to remove substantially all of the water.

9 Claims, 2 Drawing Sheets

METHOD OF MAKING HARD-FACED CERAMIC FIBER MODULE

FIELD OF THE INVENTION

The present invention relates to a hard-faced ceramic fiber module, formed from a ceramic fiber sheet or mat, and a method of forming such a module.

BACKGROUND OF THE INVENTION

The ceramic fiber industry has made serious strides into the refractory industry. The nature of ceramic fibers makes it desirable for use as furnace linings, door linings, and other operations that require rapid heat ups and shut downs.

Significant advantages for using ceramic fibers are its insulating qualities and exceptionally low heat contents. The material's light weight and ease of handling makes it desirable for installers as well.

A distinct disadvantage is the ceramic fibers inability to maintain its vitreous structure when subjected to temperatures above 2100° F. The fibers can recrystallize when temperatures are maintained above 2100° F. for prolonged periods of time. The crystallinic materials resulting for the time-temperature effect are minuscule and are readily airborne in any dynamic atmosphere.

My earlier patent, U.S. Pat. No. 5,120,477 describes a process for encapsulating ceramic fibers of a mat or sheet within a pure silica sheath which prevents crystallized powders from escaping entrapment from within the silica sheath.

Such encapsulated ceramic fibers will withstand temperatures much above the usage temperatures described in the fiber manufacturer's literature. A ceramic fiber body, rated for temperatures of 2300° F., are suggested for service temperatures not to exceed 2100° F. Yet, when the fibers are treated as described in my patent, they are unaffected when service temperatures reach 3000° F. Encapsulating the fibers raises the density of the fiber product but does not affect the thermal resistance of the product.

As previously discussed, however, at times ceramic fibers can be adversely affected when subjected to temperatures above 2100° F. As would be expected, such fibers can fail at these service conditions. The failure is not sudden and catastrophic, but as the fibers begin to wear away, the thermal resistance of the product decreases.

Untreated fiber modules are also susceptible to various furnace contaminants while in service. The nature of weaving vitreous fireclay strands into ceramic fiber blankets significantly lowers the density of the blanket when compared to the density of fireclay itself. The fibers interweave into a very porous network with air entrapped within the fiber weave. This affords the high insulating properties associated with ceramic fiber blankets. This porous media is prone to become infiltered with airborne contaminants because of its porous structure.

With the high heat of furnaces, and with airborne contaminants within a furnace, contaminants can react with ceramic fibers and drastically reduce the effectiveness of the fiber strength and insulating properties.

Fiber manufacturers, recognizing the fiber's vulnerability to contaminants and flame impingement destruction, began to produce fiber modules that packed fiber blankets into an accordion-pleated array of blanket in an attempt to minimize flame impingement damage and contaminant infiltration. The module's simplified fiber can be used as working linings in furnaces, but the fiber does not withstand contaminant infiltration or flame impingement.

Recognizing these shortcomings, the fiber manufacturers and other refractory companies developed surface coatings to enhance the fiber module's performance. Initially, these superficial coatings work until they crack and expose the fibers themselves. Once the coatings crack, failure of the entire system shortly follows.

It is an object of the present invention to provide a hard-faced ceramic module, from a ceramic fiber sheet that has a surface that is resistant to abrasion and will withstand elevated temperatures in excess of that which would usually adversely affect the ceramic fiber sheet from which the module is formed.

SUMMARY OF THE INVENTION

A hard-faced ceramic fiber module is formed from a ceramic fiber sheet, an aqueous colloidal silica suspension and ceramic fibers. A sheet of ceramic fibers, which has been folded upon itself to form an accordion-like structure has a first surface with adjacent ceramic fiber sheet folds, having intermediate valleys, and a second opposed surface. The first surface of the module is soaked in an aqueous colloidal silica suspension so as to impregnate, and preferably saturate, the same and the module is then placed into a container with the first surface exposed. A mixture of discrete ceramic fibers in an aqueous colloidal silica suspension is added so as to form a layer that covers the first surface of the module. The layer of ceramic fibers and aqueous colloidal silica suspension is then compressed, and the module, with the compressed layer thereon, is frozen. The resultant frozen module is then heated at an elevated temperature until substantially all of the water is removed from the module to produce a hard-faced ceramic fiber module.

The hard-faced ceramic fiber module produced by the present process is a folded sheet of ceramic fiber material having a first surface, that has adjacent folds with intermediate valleys, that is impregnated with colloidal silica, with a compressed layer of colloidal silica and ceramic fibers formed over the first surface that covers the adjacent folds and fills the valleys to provide a planar surface.

BRIEF DESCRIPTION OF THE DRAWINGS

The method and article of the present invention will be more fully understood by reference to the drawings which illustrate an embodiment thereof, and wherein.

DETAILED DESCRIPTION

Figure 1:
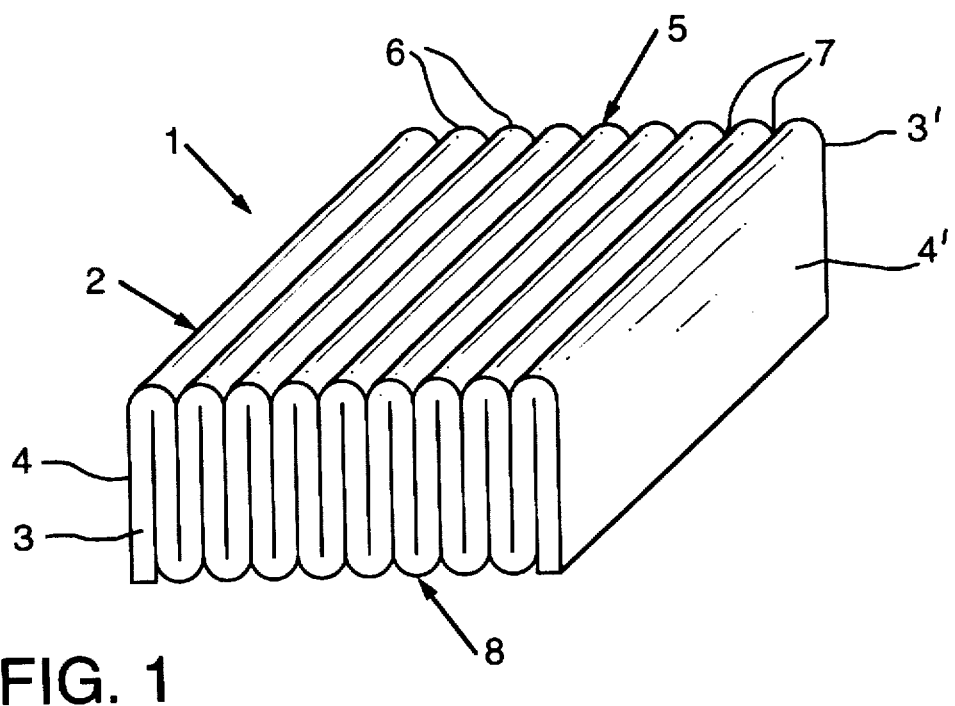
FIG. 1 illustrates a sheet of ceramic fiber material folded for use in the present method.

In accordance with the present method, a hard-faced ceramic fiber module is formed from a ceramic fiber mat or sheet. The ceramic fiber sheet, woven or unwoven, may be composed of ceramic fibers which will withstand very high temperatures, i.e. on the order of 2300° F. or higher. Suitable ceramic fibers include those of alumina, aluminum silicate, boron oxide, boron carbide, calcium-aluminum silicate, glass, mineral wool, and the like, as well as mixtures thereof. An example of such a ceramic fiber sheet is that available from the Carborundum Company under the name FIBERFRAX®, that available from the Babcock and Wilcox Company under the name Kaowool®, or that available from Johns Mansville under the name Cerafelt®. Preferably, the sheets are those capable of withstanding sustained temperatures in the range of 1600° to 2600° F.

The ceramic fiber sheet is folded upon itself so as to form, or is provided as, a module having two ends, two side walls, a first surface having adjacent folds with intermediate valleys, and a second opposed surface. The edges of the ceramic fiber sheet are preferably disposed so as to face the second opposed surface of the module.

The first surface of the module is then soaked in an aqueous colloidal silica suspension so as to saturate the same and preferably the soaking is effected, such as by placing the first surface in a contained aqueous colloidal silica suspension, to a depth of at least about 0.5 inch of the module below the valleys of the first surface. The aqueous colloidal silica suspension used is that described in my earlier patent, U.S. Pat. No. 5,120,477, the contents of said patent incorporated by reference herein, and must be freeze-sensitive, in which the silica particles precipitate or coagulate when the suspension is frozen. Such silica suspensions have silica particles therein having an average diameter of between about 10 nanometers and about 25 nanometers and a specific surface area of between about 125 meters squared per gram ($m^2/g$) and 250 ($m^2/g$). Such aqueous colloidal silica suspensions generally contain less than about 50 weight percent colloidal silica and preferably contain less than about 30 weight percent colloidal silica. Suitable aqueous colloidal silica suspensions are available from E. I. du Pont de Nemours & Co., Inc. under the trademark Ludox®, or are available from Nalco AG as colloidal silica, such as 050 Colloidal MTV. Preferred is a colloidal silica suspension available from E. I. du Pont de Nemours & Co., Inc. as Ludox® TM colloidal silica.

The aqueous colloidal silica suspension is preferably diluted with water. The colloidal silica suspension is an aqueous suspension containing about 30–50 percent by weight water. This suspension is then diluted with water, preferably in about an amount equal to the amount of the suspension. Also, a surfactant or wetting agent may be added to the aqueous suspension of colloidal silica, which surfactant may be added in an amount of about 0.01 to 0.02 percent by weight of the aqueous suspension.

After soaking of the first surface of the ceramic fiber module with the aqueous colloidal silica suspension, preferably to saturate that surface to a depth of at least 0.5 inch beyond the valleys of the surface, the module is placed in a container with the first surface exposed. The container should be form fitted to the module, i.e. the two ends and two side walls should contact the module without compressing the module, and the upper edge of the side walls of the container should be closely adjacent but above a plane formed by the upper surface of the adjacent folds of the first surface.

After containment of the module in a container with the first surface exposed, a mixture of ceramic fibers in an aqueous colloidal silica suspension, which suspension is the same as that which has been hereinbefore described, is added to the container so as to form a layer that covers the exposed surface of the module. The ceramic fibers used are of a chemical composition which is preferably the same as the ceramic fibers forming said ceramic fiber sheet. The layer will cover the adjacent folds of the first surface and fill the valleys intermediate the adjacent folds to form a planar surface. The ceramic fibers in the mixture of aqueous colloidal silica suspension should have a length of between about 4 to 10 inches, preferably 4–5 inches, and a diameter of between about 3 to 4 micrometers. The ceramic fibers should comprise about 30–40 percent by weight, and most preferably about 33⅓ percent by weight, of the mixture of ceramic fibers and aqueous colloidal suspension.

The deposited layer is then compressed, such as by application of a compression plate thereon to compress the same about 40 to 50 percent. After compression of the layer on the first surface, the module, while retained in the container, is frozen. Freezing is achieved by cooling of the module to a degree such that the soaked first surface is cooled to a temperature of 27° F. or below, which will freeze the aqueous colloidal silica suspension and cause precipitation of the silica.

After freezing, the resultant frozen module is heated to an elevated temperature sufficient to remove water from the module. Heating should be effected at a rate that will remove residual water, but prevent boiling of water from the module, and preferably up to an elevated temperature of about 500° F.

The resultant hard-faced ceramic fiber module comprises a sheet of ceramic fiber folded upon itself to form a module with a first surface having adjacent folds with intermediate valleys, the first surface impregnated with colloidal silica, and the first surface having thereon a compressed mixture of colloidal silica and ceramic fibers as a layer which covers the adjacent folds and valleys. The layer provided on the first surface of the ceramic fiber module becomes structurally and chemically intermingled with the first surface so as to protect the same and avoid separation. The modules so produced will provide a compressed layer that will withstand exposure to temperatures in excess of 2300° F. without damaging the surface thereof and without delamination of the ceramic fiber sheet forming the module.

Figure 2:
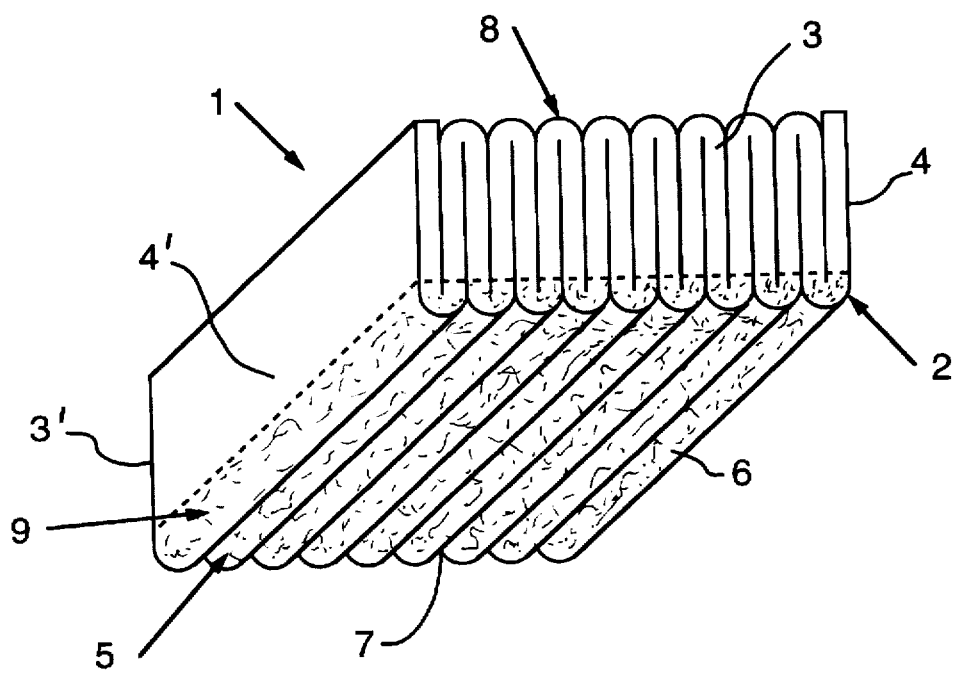
FIG. 2 illustrates the sheet of ceramic fiber material of FIG. 1 following impregnation of a first surface thereof with an aqueous colloidal silica suspension.
Figure 3:
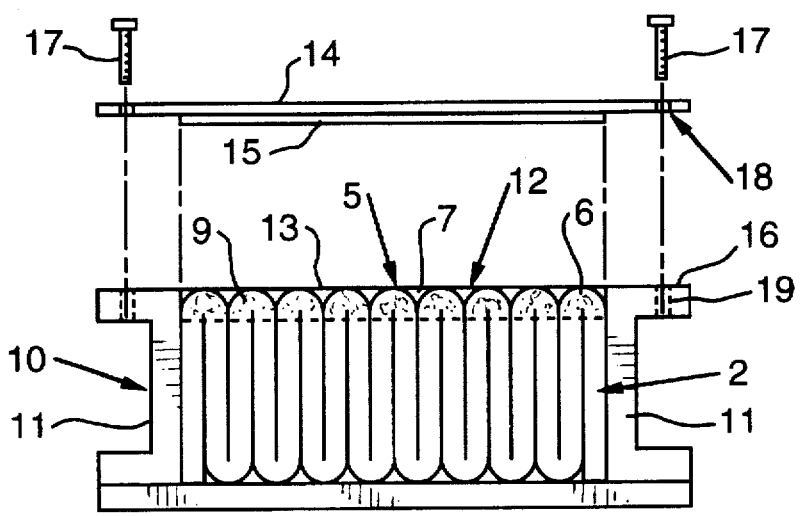
FIG. 3 illustrates the placement of the impregnated sheet of ceramic fiber material in a container with the first surface exposed and a layer of a mixture of ceramic fibers in an aqueous colloidal silica suspension placed over the first surface.
Figure 4:
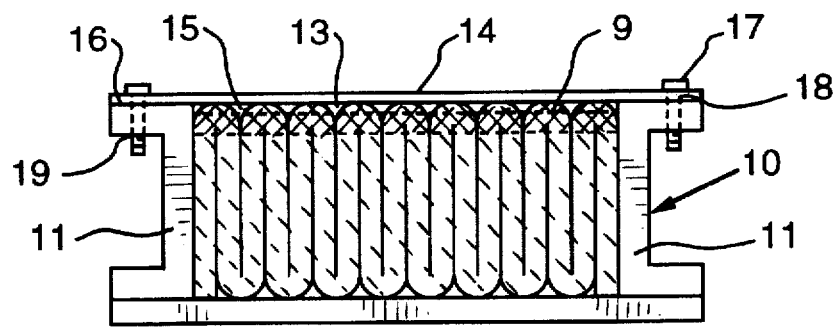
FIG. 4 illustrates the step of compressing the layer of ceramic fiber in the aqueous colloidal suspension while the module is held in the container.

Referring now to the drawings, FIG. 1 illustrates a sheet of ceramic fibers 1, which sheet has been folded upon itself in accordion-like fashion so as to form a module 2 having two ends 3 and 3', two side walls 4 and 4', a first surface 5 which is composed of adjacent folds 6 of ceramic fiber sheet 1, with intermediate valleys 7, and a second opposed surface 8. The first surface 5 of the ceramic fiber module is soaked in an aqueous colloidal silica suspension 9, preferably in a container, to an extent sufficient to impregnate and saturate the first surface 5 through the folds 6 and valley portion 7, and preferably to a depth of at least 0.5 inches internally from said valleys 7, with the aqueous colloidal silica suspension 9 (FIG. 2). The module 2 is placed into a container 10 (FIG. 3) with the first surface 5, saturated with aqueous colloidal silica suspension 9, exposed, and the walls 11 of the container extending above the first surface 5. As seen in FIG. 3, a mixture 12 of ceramic fibers in an aqueous colloidal silica suspension is then added to the container 10 to cover the first surface 5 of the module 2, such that the mixture 12 forms a layer 13 that covers the exposed surface 5 of the module 2, covering the adjacent folds 6 and filling valleys 7 thereof. The layer 13 is then compressed, such as by use of a cover 14. The cover 14 may have a compression plate 15 thereon, with the cover affixed to the upper ends 16 of the walls 11 of the container 10, such as by screws 17 which pass through apertures 18 through the cover 14 and engage with threaded bores 19 the upper ends 16 of the sidewalls 11 of the cover 14 and with the compression plate 15 compressing the layer 13 of the mixture of ceramic fiber and aqueous colloidal silica suspension.

The module 2, having the compressed layer 13 is then frozen, with the freezing preferably effected in the container 10 which acts as a mold to maintain the desired shape of the module during a freezing step.

Figure 5:
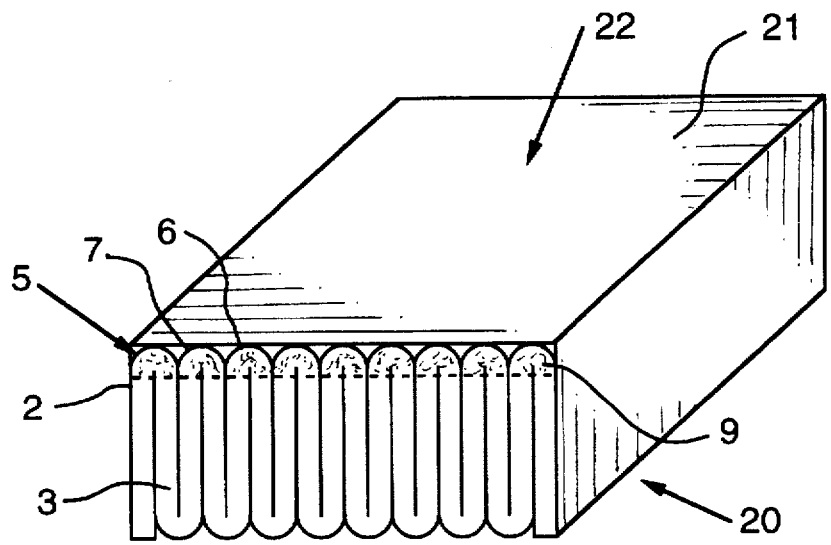
FIG. 5 illustrates a hard-faced ceramic fiber module produced according to the present method.

The frozen module is then heated to an elevated temperature until substantially all of the water is removed from the module to produce a hard-faced ceramic fiber module 20. As illustrated in FIG. 5, the hard-faced ceramic fiber module 20 comprises the module 2, with the first surface 5 impregnated with colloidal silica and having thereon a compressed mixture of colloidal silica and ceramic fibers as a layer 21 which covers and protects the adjacent folds 6 and intermediate valleys 7. The planar surface 22 formed by the layer 21 reflects heat better than an uneven surface, such as that provided by the initial folds and valleys of the first surface 5 of the ceramic fiber module 2.

What is claimed is:

1. A method of forming a hard-faced ceramic fiber module from a ceramic fiber sheet comprising:

providing a sheet of ceramic fibers, which sheet is folded upon itself so as to form a module having two ends, two side walls, a first surface having adjacent folds with intermediate valleys, and a second opposed surface;

soaking said first surface of said module in an aqueous colloidal silica suspension so as to saturate the first surface, placing said module into a container with said first surface exposed, adding a mixture of ceramic fibers in an aqueous colloidal silica suspension to said container so as to form a layer that covers said exposed first surface of said module, compressing said layer, freezing said module having said compressed layer over said first surface, and heating the resultant frozen module at an elevated temperature until substantially all of the water is removed from said module.

2. The method of forming a hard-faced ceramic fiber module from a ceramic fiber sheet as defined in claim 1 wherein said first surface is soaked in said aqueous colloidal silica suspension to a depth of at least 0.5 inch beyond the valleys of said first surface.

3. The method of forming a hard-faced ceramic fiber module from a ceramic fiber sheet as defined in claim 1 wherein said aqueous colloidal silica suspension used to soak said first surface contains about 30–50 percent by weight silica.

4. The method of forming a hard-faced ceramic fiber module from a ceramic fiber sheet as defined in claim 1 wherein said mixture of ceramic fibers in said aqueous colloidal silica suspension contains between about 30–40 percent by weight of said ceramic fibers.

5. The method of forming a hard-faced ceramic fiber module from a ceramic fiber sheet as defined in claim 4 wherein said mixture of ceramic fibers in said aqueous colloidal silica suspension contains between about 33⅓ percent by weight of said ceramic fibers.

6. The method of forming a hard-faced ceramic fiber module from a ceramic fiber sheet as defined in claim 1 wherein the ceramic fibers in said mixture of ceramic fibers in an aqueous suspension of colloidal silica have a length of between about 4 to 10 inches and a diameter of between 3 to 4 micrometers.

7. The method of forming a hard-faced ceramic fiber module from a ceramic fiber sheet as defined in claim 1, wherein said module is cooled to a temperature of 27° F. or below to freeze said module.

8. The method of forming a hard-faced ceramic fiber module from a ceramic fiber sheet as defined in claim 1 wherein said resultant frozen module is heated to a temperature of about 500° F. to remove said water.

9. A method of forming a hard-faced ceramic fiber module from a ceramic fiber sheet comprising;

folding a sheet of ceramic fibers upon itself so as to form a module having two ends, two side walls, a first surface having adjacent folds with intermediate valleys, and a second opposed surface, soaking said first surface of said module in an aqueous colloidal silica suspension so as to saturate the first surface to a depth of at least 0.5 inch beyond the valleys of said first surface, placing said module into a container with said first surface exposed, adding a mixture of ceramic fibers in an aqueous colloidal silica suspension to said container so as to form a layer that covers said exposed first surface of said module, compressing said layer, freezing said module, at a temperature of 27° F. or below, having said compressed layer over said first surface, and heating the resultant frozen module at an elevated temperature until substantially all of the water is removed from said module.

* * * * *